(12) United States Patent
Legallais

(10) Patent No.: US 7,543,697 B2
(45) Date of Patent: Jun. 9, 2009

(54) ROTARY DEVICE FOR TRANSFERRING CONTAINERS

(75) Inventor: Stéphane Legallais, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 29 days.

(21) Appl. No.: 11/883,638

(22) PCT Filed: Feb. 7, 2006

(86) PCT No.: PCT/FR2006/000280

§ 371 (c)(1),
(2), (4) Date: Aug. 3, 2007

(87) PCT Pub. No.: WO2006/084990

PCT Pub. Date: Aug. 17, 2006

(65) Prior Publication Data

US 2008/0210520 A1 Sep. 4, 2008

(30) Foreign Application Priority Data

Feb. 8, 2005 (FR) .................................. 05 01265

(51) Int. Cl.
*B65G 47/34* (2006.01)
(52) U.S. Cl. ................ 198/478.1; 198/470.1; 198/474.1
(58) Field of Classification Search .............. 198/469.1, 198/470.1, 474.1, 475.1, 476.1, 478.1
See application file for complete search history.

(56) References Cited

U.S. PATENT DOCUMENTS

| 2,366,615 | A | * | 1/1945 | Hansen | 198/478.1 |
| 2,609,946 | A | * | 9/1952 | Brager et al. | 198/443 |
| 3,659,694 | A | | 5/1972 | Harris | |
| 4,044,659 | A | * | 8/1977 | Bardenhagen et al. | 198/474.1 |
| 4,506,779 | A | * | 3/1985 | Seragnoli | 198/471.1 |
| 5,865,595 | A | * | 2/1999 | Spatafora | 198/474.1 |
| 6,779,651 | B1 | * | 8/2004 | Linglet et al. | 198/470.1 |
| 6,823,982 | B2 | * | 11/2004 | Salicini et al. | 198/476.1 |

FOREIGN PATENT DOCUMENTS

FR  2 479 077 A  10/1981

\* cited by examiner

*Primary Examiner*—James R Bidwell
(74) *Attorney, Agent, or Firm*—Sughrue Mion, PLLC

(57) ABSTRACT

Rotary device for transferring containers, with a base (21) rotating about an axis (23) and supporting a mobile assembly (25) comprising: a main arm (26) pivoting (27) on the base, a gripping pincer (30) at the free end of the main arm, and a rotary roller (32) which is solidly connected to the main arm and interacts with a fixed curvilinear cam (33) with a closed contour; the pivot shaft (27) and the free end of the main arm define a line (L) which extends approximately tangentially to the circular trajectory of the pivot axis, which precedes the free end of the arm in the direction (F) of rotation of the base; the cam is such that, when the base rotates, the end of the main arm is moved approximately radially; and the gripping pincer mounted on the free end of the main arm follows a predetermined circular path, having inverse convexity with respect to the trajectory of the rotary base, within a fixed angular range ($\alpha$) of rotation of the base.

10 Claims, 8 Drawing Sheets

US 7,543,697 B2

ROTARY DEVICE FOR TRANSFERRING CONTAINERS

FIELD OF THE INVENTION

The present invention relates to improvements made to rotary devices for transferring containers, each having a rotary base which rotates continuously about an axis of rotation and which supports at least one moving assembly comprising:
- a main arm mounted pivotably on said base by means of a pivot shaft,
- a gripping pincer mounted on the free end of said main arm, and
- at least one freely rotating cam follower roller connected solidly to said main arm and capable of interacting with a fixed curvilinear cam extending along a closed contour.

In the following text, the term "container" can be applied, depending on the positioning of the conveyor device within the installation, to a blank container, such as a preform or an intermediate container, before it is placed in a mold, or to a container (final or intermediate) after it has been shaped in a mold.

BACKGROUND OF THE INVENTION

The devices to which the invention relates are used in installations for manufacturing containers such as bottles by processes of blowing or stretch-blowing of hot preforms of thermoplastic resin such as PET or PEN, transfer arm (or transfer star) conveying devices being used, in particular, at the entrances of molds for introducing the hot preforms into the molds and at the exits of molds for recovering the containers which have been formed. These operations for introducing the preforms into the molds and recovering formed vessels take place continuously, the two transfer arm devices, at the entry and exit, rotating continuously in synchronization with a rotary carousel supporting the molds, this carousel following the predetermined circular path whose convexity is inverse with respect to the trajectory of the rotary base.

The arrangement of the transfer arms must be such that:
- the gripping pincer provided at the end of each arm accompanies the neck of the container (in other words the preform or blank at the entry to the carousel or a container proper, final or intermediate, at the exit from the carousel) over a given angular sector extending on both sides of the point of tangency of the corresponding circular trajectories of the pincer and of the central axis of the molds carried by the carousel, even when these trajectories extend with concavities facing in opposite directions from each other, the sector being required to have a sufficient extension to permit the gripping or release of the container in the mold;
- there is no interference between the molds and the containers transported by the arms while the transfer of containers by the arms is taking place.

The document FR 2 479 077 shows and describes an arrangement of a transfer arm conveyor device (FIGS. 6-12; page 7, line 16 to page 8, line 15, and page 10, line 20, to page 11, line 26). With reference to FIGS. 1 to 3 of the attached drawings (corresponding to FIGS. 8, 10 and 11 of the document FR 2 479 077 respectively), the known conveyor device comprises a rotary plate 1 which carries a plurality of transfer arms 2 distributed regularly over its periphery. These transfer arms 2 are mounted pivotably on the plate 1 by means of corresponding pivot shafts 3. In order to make each transfer arm 2 pivot to both sides of its radial position, each arm 2 is connected solidly to a lever 4 carrying a roller 5 which interacts with, and follows, a fixed cam 6 having a closed curvilinear shape.

Additionally, each transfer arm 2 is made in telescopic form. For this purpose, each arm 2 comprises a stirrup 7 which is connected solidly to the shaft 3 for pivoting on the plate 1. A rod 8 is mounted in a freely slidable way in the stirrup 7, and is returned to a position of minimum elongation by a spring 9 interposed between the said rod 8 and the stirrup 7. The rod 8 is connected solidly to a roller 10 which interacts with, and follows, a fixed cam extending with a closed curvilinear contour, the roller 10 bearing on the cam causing the length of the transfer arm 2 to vary as a function of the contour of the cam during the rotation of the plate 1.

At its free end, the rod 8 supports a pincer 11 for gripping containers, with two pivoting jaws 12, 13, brought towards each other by a spring 14. In the illustrated embodiment, a mechanism for opening the jaws 12, 13 is provided, to act in opposition to the spring 14 in order to enable the containers to be gripped or released easily. This mechanism comprises a link rod 15 pivoted on the pincer 11 and also pivoted on a lever 16 mounted pivotably about a shaft 17 on the stirrup 7. The other end of the lever 16 supports a roller 18 interacting with a fixed cam path defining a curvilinear trajectory 19.

In other known devices, the jaw opening mechanism is not provided, and in this case the gripping or release of the containers by the jaws takes place by force.

In FIG. 3, the trajectory followed by the pivot shaft 3 is indicated by 20.

Because of this structural arrangement and the appropriate shaping of the different cams, the known device can operate in the following manner, which is shown schematically in FIG. 3 of the attached drawings (where the straight line joining the centre of rotation of the device and of the carousel and passing through the point D of tangency of the two circular trajectories is considered to be the reference axis) In FIG. 3, a single transfer arm 2 is shown in a highly schematic way in its different positions during a revolution of the plate 1.

At approximately the beginning of the quarter of the circular trajectory downstream of the point of tangency D (with respect to the direction of rotation of the conveyor device), the transfer arm 2 is made to pivot, being actuated by the roller 5 engaged in the cam 6, so that it advances on its radial position, in other words the free end of the arm 2 supporting the pincer 11 precedes the pivot shaft 3 of the arm 2 on the plate 1. Simultaneously, the rod 8 is actuated by the roller 10, engaged with the corresponding cams, so that it extends with respect to the stirrup 7 in such a way that the transfer arm 2 reaches its maximum length. Thus the pincer 11 is brought, at a point D1 located upstream of the point D, substantially into coincidence with the trajectory of the mold axis upstream of the point of tangency D.

Because of the appropriate shapes of the respective cams guiding the rollers 5 and 10 respectively, the transfer arm 2 is then progressively brought toward its radial position which it reaches when its shaft 3 for pivoting on the plate 1 coincides with the reference axis defined above, at the same time as the rod 8 is progressively retracted into the stirrup 7 and the length of the arm 2 decreases to a minimum when the pivot shaft 3 of the arm reaches a position of coincidence with the reference axis.

Beyond the reference axis, in an inverse movement, the transfer arm 2 is made to pivot upstream (with respect to the direction of rotation), moving progressively away from its radial position, while its length is simultaneously made to increase by the progressive extension of the rod 8 out of the stirrup 7.

Because of this arrangement, the pincer 11 is made to remain in coincidence with the axis of the mold and accompanies the latter through a predetermined angular sector α which is sufficient to enable a preform to be introduced into the mold (at the entrance) or to enable a container to be removed from the mold (at the exit) without interference with the moving parts of the mold and while allowing these moving parts of the mold the time required for their movement (including the closing time for the mold at the entrance and the opening time at the exit).

Variant embodiments of this basic structure have been devised for specific applications; in particular, the document FR 2 802 191 describes a variant with a double gripping pincer for interaction with a double-cavity mold processing two containers simultaneously, in which the double-pincer unit is mounted pivotably at the end of the transfer arm. Other adaptations are indicated in the documents FR 2 709 264, FR 2 731 176 and FR 2 796 588.

It is true that these known arrangements are entirely satisfactory and are currently applied in the aforementioned container manufacturing installations.

However, these arrangements are structurally complex, using, for example, sliding members as part of the structure of the telescopic arms, which generate friction and consequently wear; this results in the progressive development of play which generates vibration and noise. Furthermore, the multiple movements of moving parts require the installation of corresponding cams, which are difficult to manufacture and require an amount of space according to their number.

Above all, the conveyor device designed as described above has a large transverse dimension, and the overall bulk of the conveyor device is even more troublesome because the bulk of the devices located at the entrance of the molding device projects from the unit formed by the installation as a whole.

Finally, the multiplicity of the members and the multiplicity of the movements are such that it is impossible to attempt to make the known conveyor device operate at higher speeds than those currently used, even though there is a strong demand for higher output rates among the users of container manufacturing installations.

SUMMARY OF THE INVENTION

The object of the invention is therefore to respond to the various requirements of the industry and to propose an improved conveyor device which, while remaining capable of providing the function of delivering preforms or gripping finished containers by accompanying the mold through a given angular sector, has a simplified structure with fewer component members and fewer moving members (with a reduced number of cams); which is more compact, thus enabling installations to be made in a generally more concentrated shape; and which can support higher operating speeds.

For these purposes, a rotary container conveyor device as mentioned in the preamble is characterized, when designed according to the invention, in that the pivot shaft and the free end of the main arm define a line which extends approximately tangentially to the circular trajectory of said pivot shaft, the pivot shaft preceding the free end of the arm in the direction of rotation of the base, in that the curvilinear cam is configured in such a way that, during the rotation of the base, the end of said main arm driven by the follower roller is moved in an approximately radial direction, and in that the gripping pincer mounted on said free end of the main arm follows, over a fixed angular range of the rotation of the base, a predetermined circular path whose convexity is the inverse of the trajectory of the rotary base.

Because of the proposed arrangement according to the invention, the transfer arm has a simple structure, without sliding members, and all of its movements are purely rotary. Moreover, the capacity of movement of the rotary arm is reduced to pivoting about its axis of mounting on the plate, so that this pivoting movement can be actuated by a single follower roller engaged in a single cam with two guide tracks opposite each other, or, in order to avoid phenomena of rebound of the roller, with two rollers, one above the other, interacting with a cam with two guide tracks facing each other and offset vertically.

Admittedly, with a transfer arm designed in this way, the gripping pincer is no longer capable of accompanying the molding axis in a perfectly coaxial way through the predetermined angle of rotation α mentioned above with reference to the prior arrangement. However, it must be borne in mind that the radial difference between the axis of the mold and the pincer, which decreases upstream of the point of tangency D and increases downstream of said point, is in practice very small, typically a few hundredths of a millimeter, or up to a few tenths of a millimeter: it is therefore entirely possible to provide a movement of the transfer which enables the pincer to accompany the axis of the mold as closely as possible, while ensuring that there is no contact between the container supported by the pincer and the wall of the mold. In other words, it is possible to act in such a way that the pincer does not strictly accompany the axis of the mold coaxially with the rotary movement of the latter (which would make it completely certain that there was no contact between the container and the wall of the mold), but follows a trajectory such that the container accompanies the closing or opening movement of the half-mold with the maintenance of a minimum safe distance between this half-mold and the container, thus ensuring that there is contact between them.

Clearly, the structural simplification of the transfer arm and its actuation results in a conveyor device which is less costly and, which, above all, can operate at substantially higher speeds than those of the existing devices, a factor which, in combination with the improvements also made to other linked devices, enables the whole container manufacturing installation to operate at substantially greater speeds.

In an attempt to reduce to some degree the transverse dimension of the conveyor device during the approximately radial movement of the gripping pincer, in a preferred embodiment:

the main arm of the transfer arm is approximately L-shaped, with a first branch mounted by one of its ends on said rotary base by means of said pivot shaft and with a second branch extending approximately transversely to said first branch, and said first branch supports, at its free end, said gripping pincer which extends substantially transversely to said second branch.

In the latter case, a possible embodiment consists in making the follower roller connected solidly to the second branch of the main arm. In this case, it is useful for the follower roller to be supported by a lever arm which extends approximately transversely to the second branch of the main arm, opposite the first branch. In particular, it is possible to make the first branch and the gripping pincer extend from the same side of the second branch and to make the lever arm extend from the opposite side. This arrangement reduces the grip of the base and enables the arm to be offset.

In practical terms, in a specific example of embodiment, the first and second branch of the main arm are made to form between them an angle of more than 90° and in the range from 100° to 110°.

In another specific example of embodiment, the pincer is made to be oriented, with respect to said second branch of the main arm, at an angle of more than 90° and in the range from 95° to 110°.

The rotary base preferably comprises a plate and at least one support arm connected solidly to said plate and extending substantially radially thereto, and the end of this support arm supports the pivot shaft of the transfer arm.

By a simple and known method, the pincer is made to be of the type which is automatically returned by a spring to the closed position.

To ensure that the arm is correctly guided without any rebound phenomena which would generate vibration and noise, it is desirable for the device to have two idle rollers, one above the other, for interaction, respectively, with two cams, namely an inner and outer cam respectively, which are offset with respect to each other.

BRIEF DESCRIPTION OF THE DRAWINGS

The invention will be more easily understood with the aid of the following detailed description of some preferred embodiments, provided solely by way of illustration. This description makes reference to the attached drawings, in which.

DETAILED DESCRIPTION OF THE INVENTION

Figure 4A:
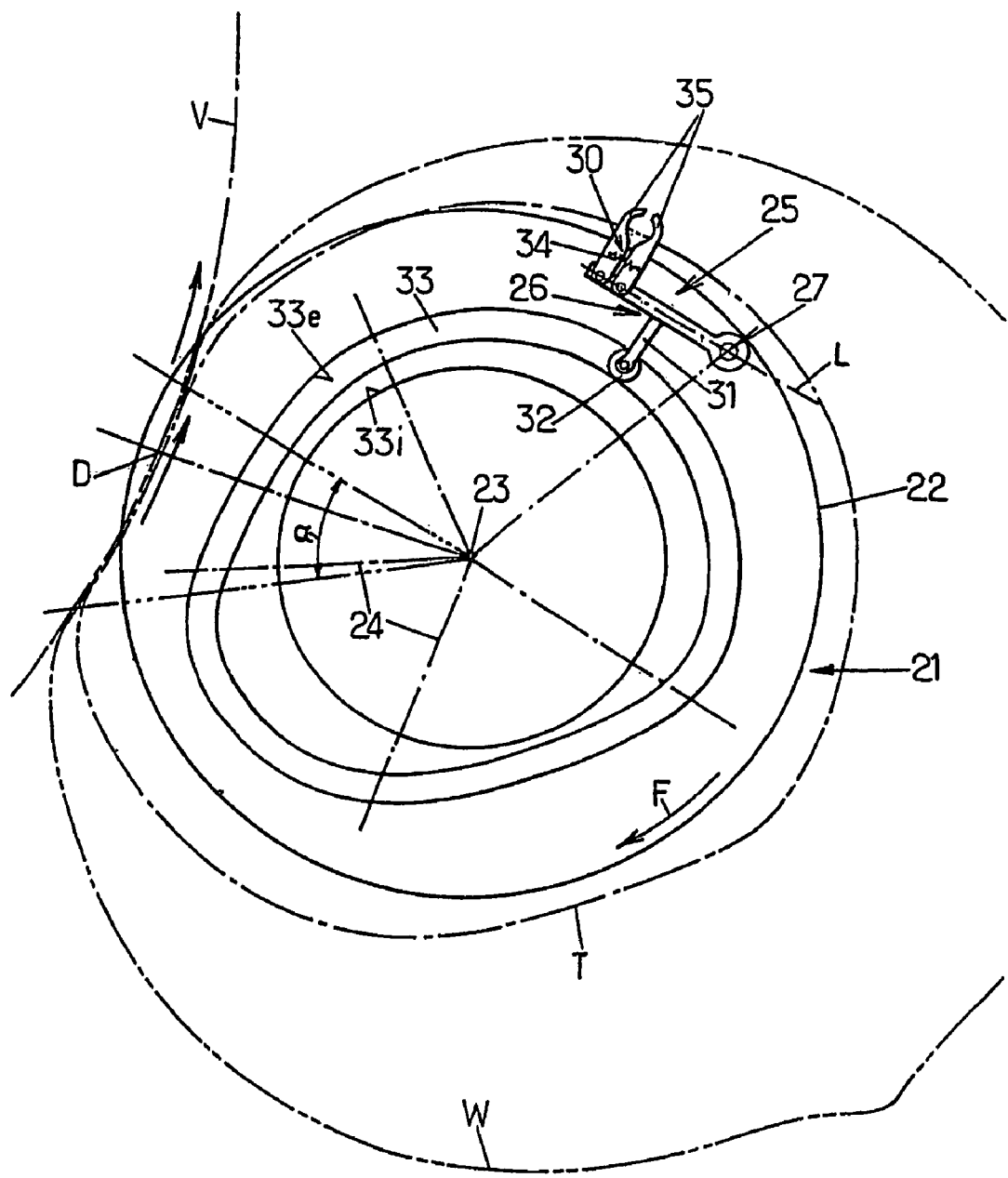
FIG. 4A is a highly schematic view from above, showing a container conveyor device designed according to the invention, showing only one transfer arm for the sake of simplicity and clarity of the drawing.

With reference to FIG. 4A initially, the conveyor device according to the invention has a rotary base 21 (corresponding to the rotary plate 1 of the prior art device) which can advantageously comprise a rotary plate 22 rotating about a vertical axis 23.

The plate 22 supports at least one mobile assembly 25 (and in practice a plurality of assemblies), which is designed as follows. A main arm 26 is supported pivotably on the plate 22 by means of a vertical shaft 27, the main arm 26 being capable of pivoting in a horizontal plane, substantially parallel to the plane of the plate 22. A gripping pincer 30 is mounted on the free end of the main arm 26, and this gripping pincer 30 extends approximately transversely to the arm 26. Finally, at least one freely rotating follower roller 32 is connected solidly to the main arm 26 and interacts with a fixed cam 33 having a curvilinear profile closed on itself about the axis 23. The roller 32 can be mounted at the end of a lever arm 31 transverse to the main arm 26 and connected solidly thereto.

According to the invention, the pivot shaft 27 and the free end of the main arm 26 are made to define a line L which extends approximately tangentially to the circular trajectory of said pivot shaft 27, the pivot shaft 27 preceding the free end of the arm 26, and consequently the gripping pincer 30, in the direction of rotation (arrow F) of the base 21.

The curvilinear cam 33 is also made to be configured in such a way that, during the rotation of the base 21, the free end, equipped with the gripping pincer 30, of said main arm 26 driven by the follower roller 32 is moved approximately radially.

Finally, the gripping pincer 30 mounted on said free end of the main arm 26 is also made to follow, over fixed angular range α of the rotation of the base 21, a predetermined circular path whose convexity is inverse with respect to the trajectory of the rotary base 21, in other words the outward facing concavity as shown in FIG. 4A.

Figure 4B:
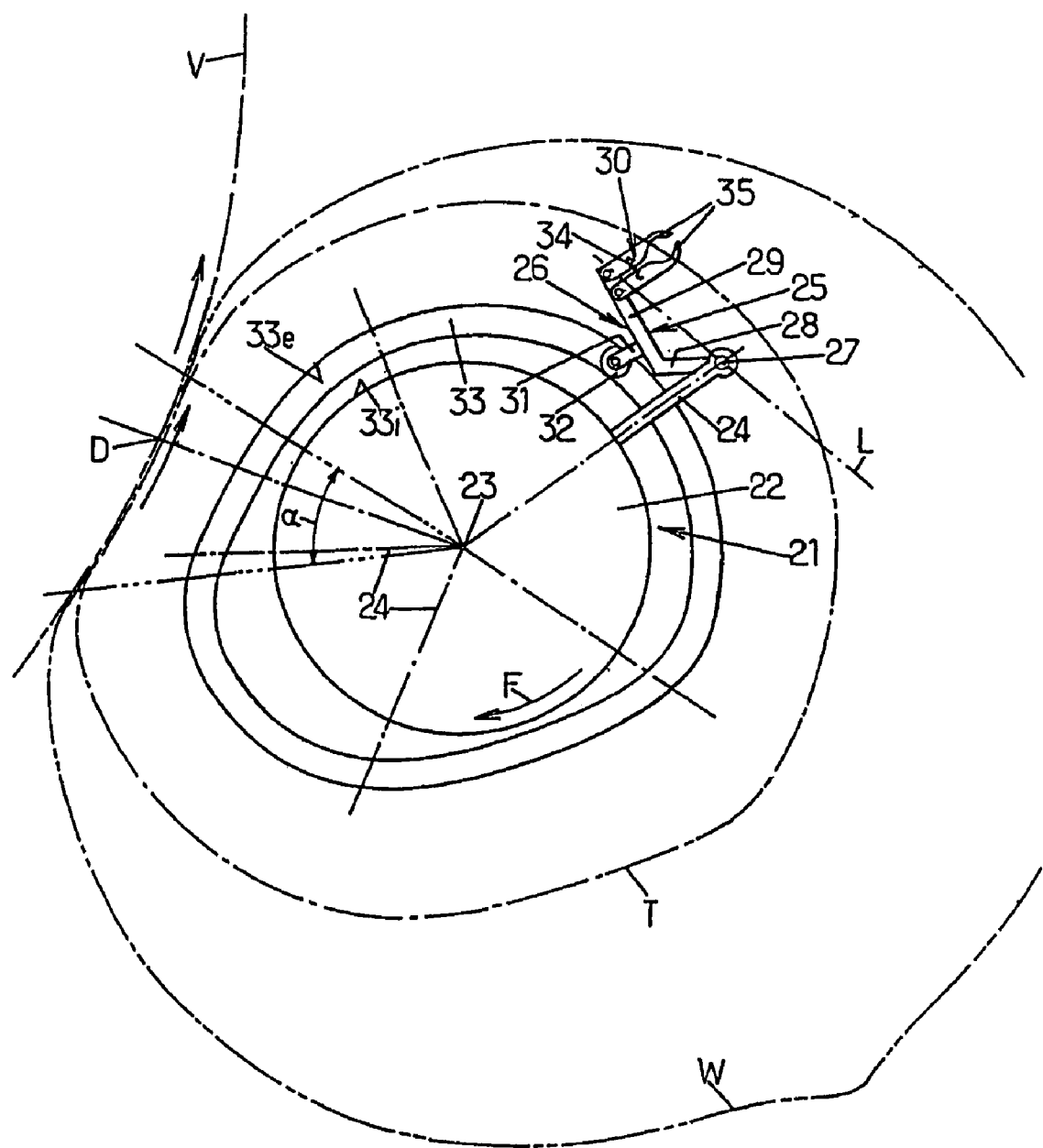
FIG. 4B is a highly schematic view from above, showing a preferred variant embodiment of the conveyor device of FIG. 4A.

Reference will now be made to FIG. 4B for the illustration of a preferred variant embodiment of the conveyor device which has just been described. In this variant, the rotary base 21 comprises a rotary plate 22, rotating about the vertical axis 23, which has a considerably smaller diameter and which is provided with a plurality of fixed radial arms 24 (for example five arms 24 offset angularly by 60° in the illustrated example). By way of illustration, the length of the arms 24 is approximately equal to the radius of the plate 22. This arrangement makes it possible, on the one hand, to make the rotary part substantially lighter than that of the prior art device or of the preceding device, and, on the other hand, to provide free space between two consecutive mobile assemblies in such a way that each mobile assembly which will be described below can operate without having to be offset radially too far from the vertical axis of rotation 23.

Each radial arm 24 supports a mobile assembly 25 which is designed as follows. As in the previous case, the main arm 26 is supported pivotably at the end of the radial arm 24 by means of the vertical shaft 27. In this case, the main arm 26 is approximately L-shaped, with a first branch 28 mounted, by one of its ends, on the end of the radial arm 24 of the rotary base 21, by means of the shaft 27, and with a second branch 29 extending approximately transversely to said first branch 28. Additionally, the gripping pincer 30 is mounted on the free end of the second branch 29 of the main arm 26, and this gripping pincer 30 extends approximately transversely to the second branch 29.

Finally, the lever arm 31 is connected solidly, by one of its ends, preferably to the second branch 29 of the main arm 26, and supports at its other end at least one follower roller 32.

Figure 5:
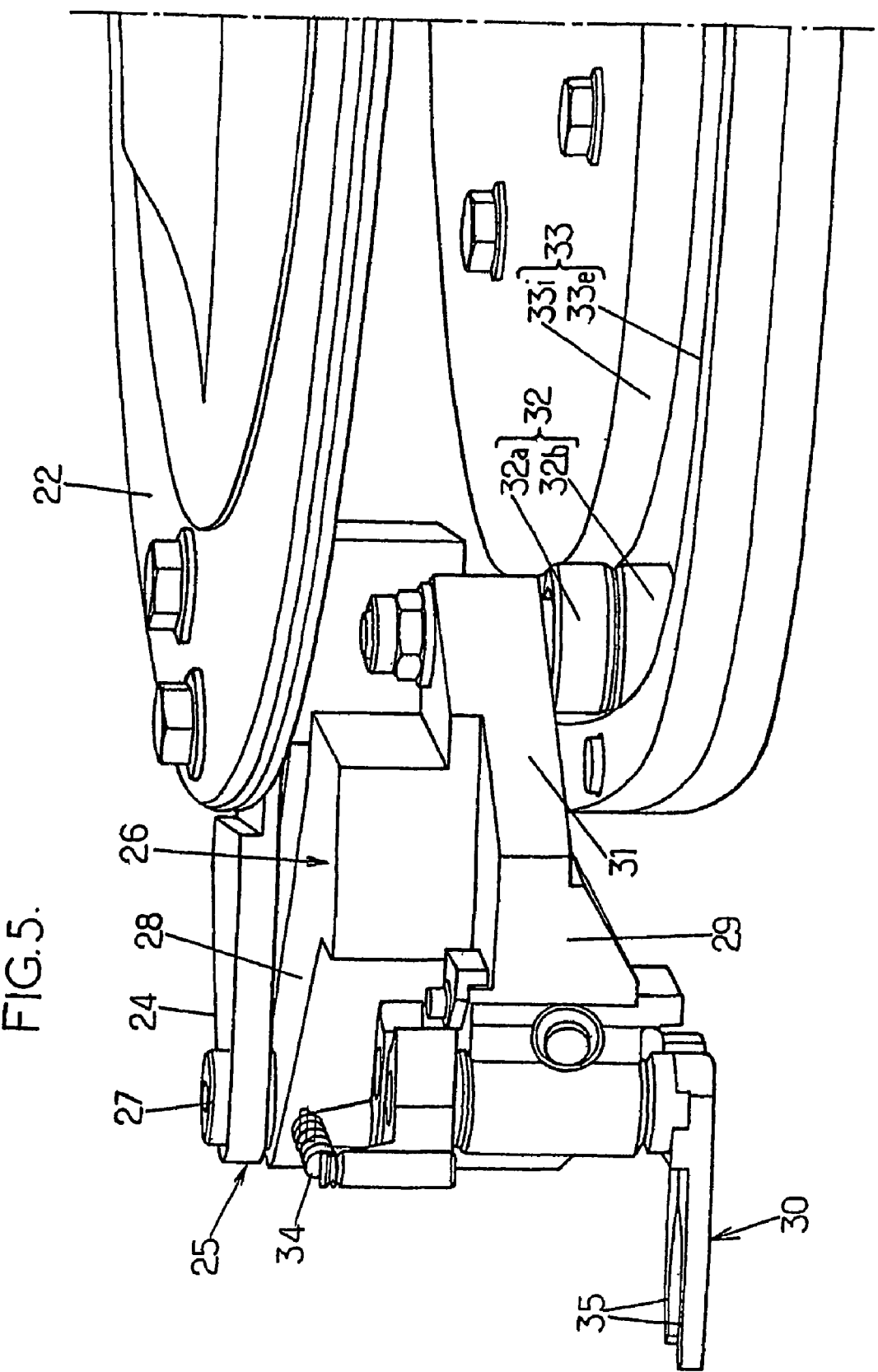
FIG. 5 is a perspective view from the side, taken at a highly inclined angle, of a specific example of embodiment of a transfer arm for the conveyor device of FIG. 4.

As shown in FIG. 5, in order to avoid a phenomenon of rebound in the case in which there is a single roller 32, two rollers 32a, 32b are advantageously provided, for interaction, respectively, with two cams 33i, 33e opposite each other and vertically offset, the cam 33i being in an inner position and the other cam 33e being in an outer position, to provide a guide channel.

To reduce the radial dimension of the rotary assembly as much as possible, the approximately L-shaped main arm 26 is fixed to the radial arm 24 in such a way that the first branch 28 of said main arm 26 extends approximately inward, toward the plate 22, from the pivot shaft 27, in such a way that the mobile assembly 25 is mainly housed along the radial arm 24 and does not substantially extend radially beyond the end of the radial arm 24. Thus, in this context, said line L no longer coincides with the main arm 26, which is retracted radially inward with respect to this line.

It should also be noted that the gripping pincer 30 is mounted on the second branch 29 so as to extend transversely thereto on the same side as the first branch 28, this assembly being approximately U-shaped. To facilitate the mounting and movement, the first and second branches 28, 29 of the main arm are not perpendicular to each other, but form between them an angle of more than 90°, preferably in the range from 100° to 110°. Similarly, the gripping pincer 30 forms with the second branch 29 an angle of more than 90°, and preferably in the range from 95° to 110°.

As for the lever arm 31, this is mounted on the second branch 29 opposite the first branch 28 and the gripping pincer 30, in such a way that the cam 33 has a (variable) radius of relatively small extension with respect to the axis of rotation 23.

It should be emphasized that the gripping pincer 30 can be designed in any way appropriate for its function.

Figure 1:
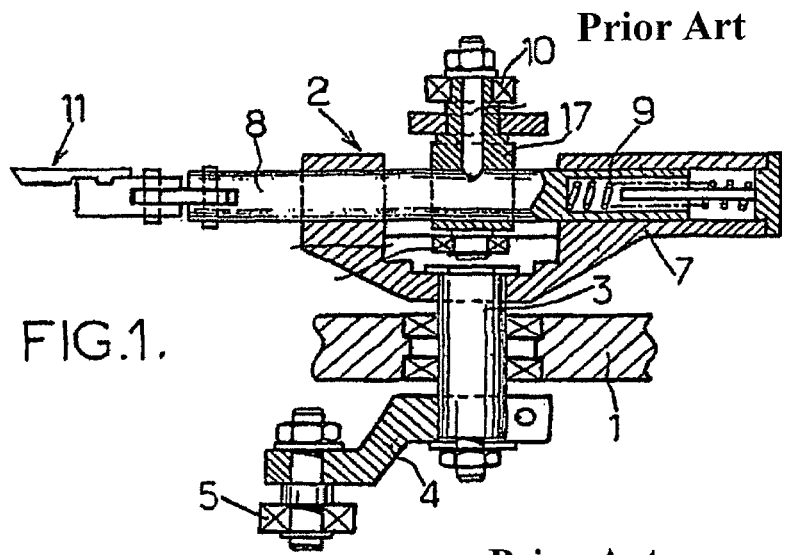
FIGS. 1 and 2 are views, in lateral cross section and from above respectively, of a transfer arm according to the prior art (identical to FIGS. 8 and 10 respectively in the document FR 2 479 077)
Figure 2:
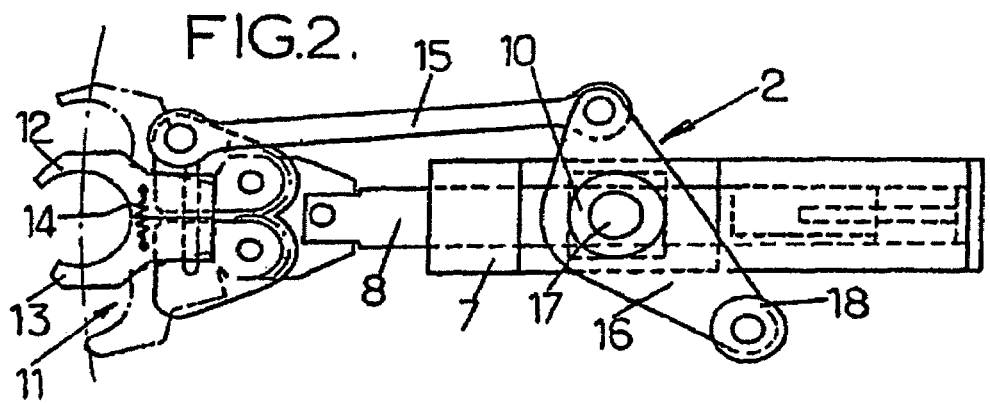
Figure 3:
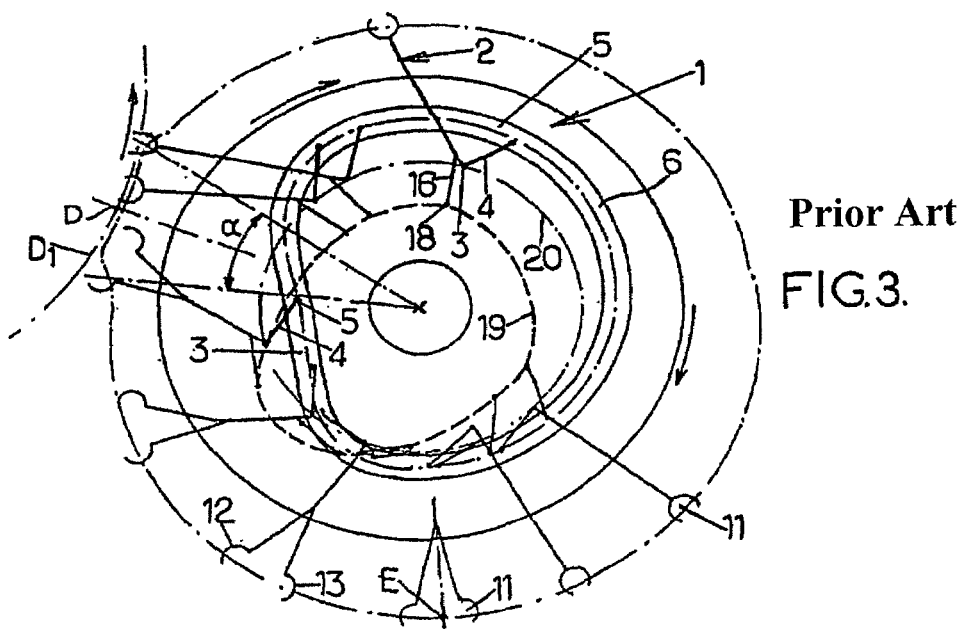
FIG. 3 is a highly schematic view from above showing the operation of a container conveyor device according to the prior art (identical to FIG. 11 of document FR 2 479 077), equipped with transfer arms designed according-to FIGS. 1 and 2.

Advantageously, as shown in FIGS. 4A, 4B and 5, the type of pincer shown in FIG. 2 is used to avoid complex actuation for opening and/or closing by cam and roller. This pincer is opened in contact with the neck of the container under the action of the push or the pull of the main arm 26 driven by the roller 32 which is moved in the cam 33, while in the absence of any opposing force a return spring 34 returns the jaws 35 to the closed position.

Because of the means which have been described, it is possible to provide any desired radial position of the gripping pincer 30 by guiding the roller 32 appropriately, by giving the cam 33 the required shape with respect to the axis of rotation 23.

In FIGS. 4A and 4B, the trajectory followed by the gripping pincer 30, as a result of the combination of the rotary movement of the pivot shaft 27 about the axis of rotation 23 and the combined movement of rotation and radial movement of the roller 32 in the cam 33 is T-shaped. It should be noted that, in an angular sector α, the trajectory T follows the convex curvilinear trajectory V followed by the axis of the devices (for example the molds) with which the containers are exchanged (being collected or delivered).

With reference to FIGS. 4A and 4B, it should be noted that, with a much simpler structure than that of the prior art device, it is possible not only to provide the pincer 30 with a trajectory T accompanying the trajectory V through a desired angular sector, but also to make the trajectory T of the pincer 30 have a radial extension about the axis 23 which is much smaller than that (illustrated at W for comparison) of the pincer of the prior art device. Thus a much less bulky conveyor device than the prior art device is formed, resulting more generally in a container manufacturing installation occupying a smaller ground area.

It should also be emphasized that the specific structure described here with the rotary base 21 and the simplified structure given to the mobile assemblies 25 provided at the ends of the corresponding radial arms 24 result in a considerable lightening of the rotary assembly and consequently lower inertia. Furthermore, in each mobile assembly 25 the only movement is the pivoting movement of the main arm 26, instead of the complex combination of rotary and translational movements in the prior art device, and this single pivoting movement requires only a single cam, instead of the multiple cams of the prior art device: this results in less friction and less resistance to rotation for the driving of the rotary base 21, and less occupation of space.

Finally, it is possible to make this lighter and less resistant device rotate at speeds substantially higher than those which can be achieved with the prior art device, and this, in combination with other arrangements made in other associated devices, makes it possible to propose higher output rates for the complete installation. Moreover, this considerable advantage is accompanied by a substantial reduction in the production costs of the device according to the invention (with a reduction in raw material, a reduction in component machining costs, and a reduction in the assembly and mounting costs due to the reduced number of components).

It is worth mentioning here that the conveyor device with a simplified structure is admittedly intended to perform the same overall function as the prior art conveyor device, namely that of acting in such a way that the gripping device accompanies, through a predetermined angular sector, a device which follows a circular trajectory which is convex with respect to the trajectory followed by the pincer and to which the pincer delivers a container or from which the pincer collects a container. However, although the desired function is indeed performed in its general feature by the device according to the invention, the operation of the device according to the invention differs substantially in detail from that of the prior art device purely as a result of the use of a simplified structure.

This is because, as specified above, the prior art device was designed in such a way that the pincer accompanies the associated device through a given angular sector while remaining strictly coaxial with the axis of a container support (for example the axis of a mold) provided on said associated device. It is the maintenance of this coaxiality throughout the angular sector that led to the aforementioned complex design of the transfer arms, the desired objective, which is achieved in practice, being to prevent any interference between the container delivered or collected by the pincer and the associated device (the walls of the mold for example).

Operating in a different way, the simplified structure of the mobile assembly 25 according to the invention and described above with reference to FIGS. 4A, 4B and 5 does not enable strict coaxiality to be maintained throughout the angular sector: strict coaxiality is provided only in the central part of the angular sector in which the trajectories coincide, while in the beginning and ending areas of this angular sector the axis of the pincer is slightly offset with respect to the axis of the housing of the associated device. However, it should be pointed out that the difference is very small, being of the order of a few tenths of a millimeter, and in practice this causes no problems. If the associated device is a book-type mold, the container delivered or collected by the pincer of the conveyor device designed according to the invention accompanies the movement of one of the half-molds being closed or opened respectively, but without coming into contact with it.

It is precisely the acceptance of this offset of the pincer with respect to the housing of the associated device during operation, in areas of the trajectory where coaxiality is not absolutely essential, that made it possible to design a transfer arm with a simplified structure capable of meeting the different requirements of lower cost and higher operating speed.

Figure 6:
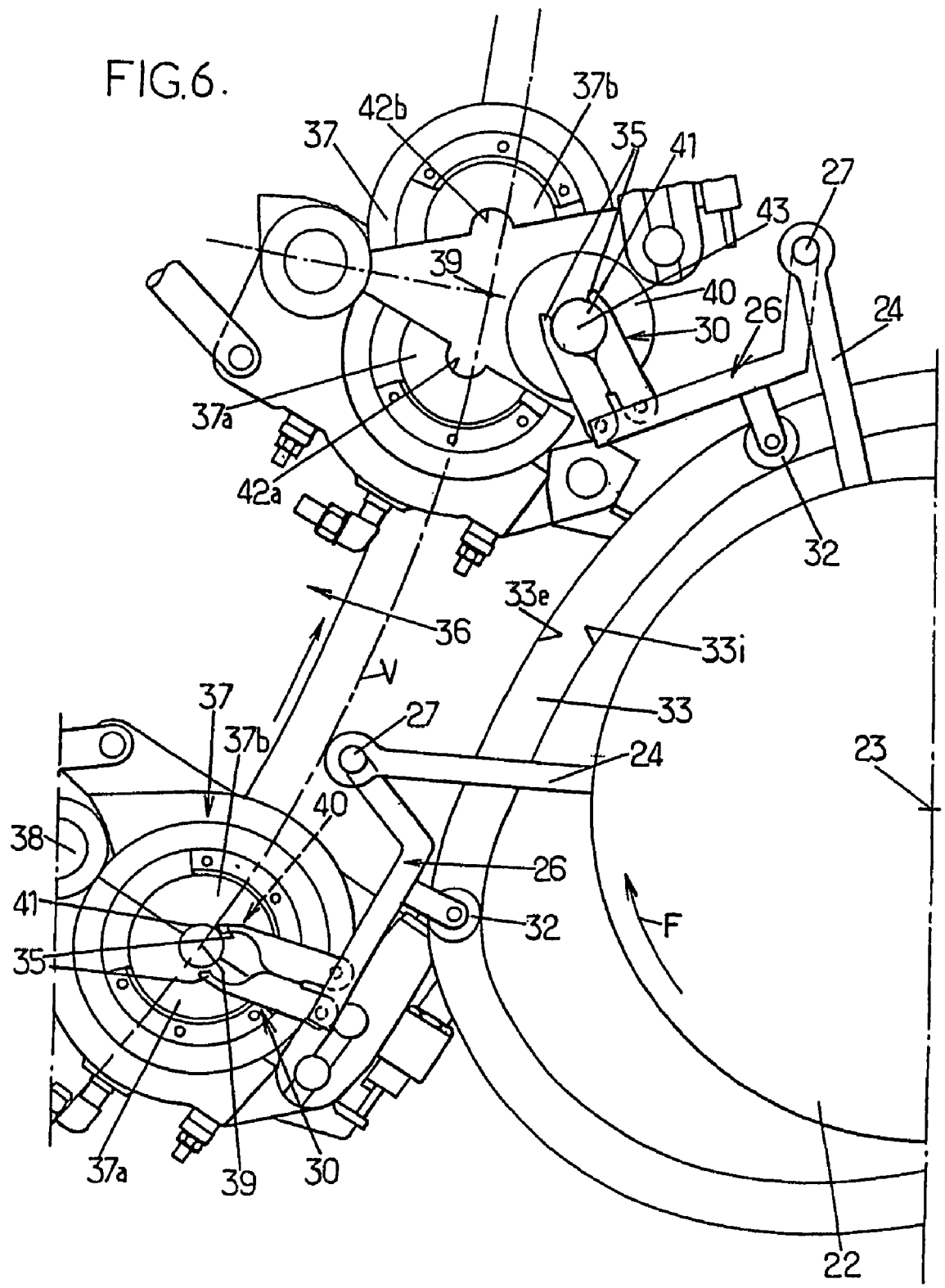
FIGS. 6 to 8 are plan views showing the operation of the conveyor device according to the invention at a plurality of instants of the process of gripping a container in a mold.
Figure 7:
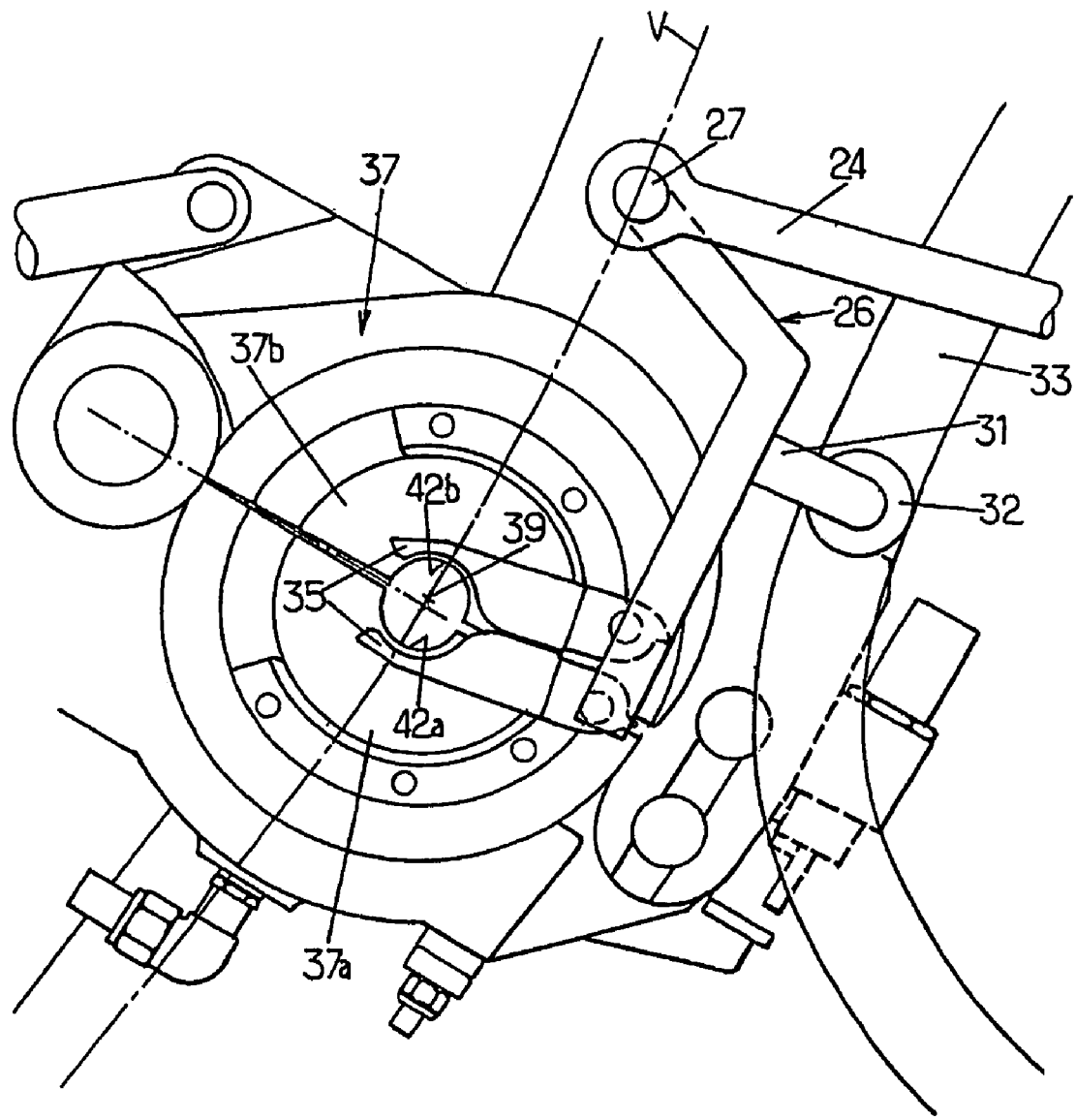
Figure 8:
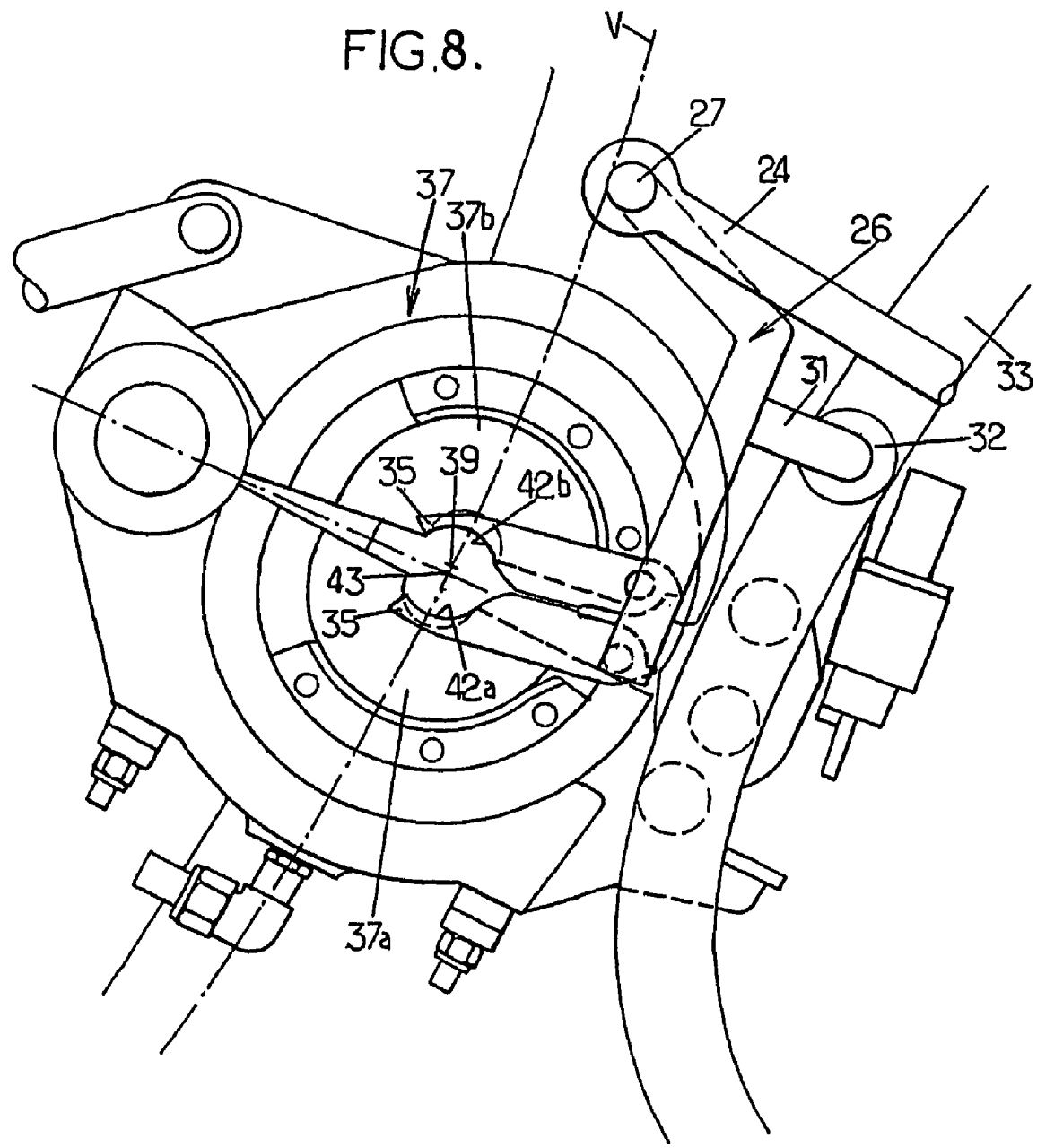

By way of illustration concerning this point, FIGS. 6 to 8 of the attached drawings show, on a larger scale, the operation of the conveyor device according to the invention in association with a rotary carousel 36 supporting on its periphery a multiplicity of blow molds or stretch-blow molds 37 for the manufacture of containers (bottles in the present case) from thermodeformable resin, particularly PET.

Reference will be made initially to FIGS. 6 and 7 which show three steps of the collection of a finished container from a mold by the gripping pincer 30. Each mold 37 is assumed to be of the book type with two half-molds 37a, 37b joined by a pivot shaft 38. The axis 39 of the mold 37 follows a circular trajectory indicated by the circular line V.

In FIG. 6, the mold 37 in the lower part of the drawing is in the closed position; a container 40 has just been molded therein by blowing or stretch-blowing, and only the neck 41 of this container, which projects from the mold, is visible. In this case, the container is coaxial with the mold. The conveyor device is in a position such that, under the action of the main arm 26 pushed by the roller 32 guided in the cam 33 of appropriate shape, the pincer 30 is moved radially outward (with respect to the axis 23) and is shown here at the point where it comes into contact with the neck 41 of the container.

As the radial outward movement of the pincer 30 continues, the pincer 30 opens in contact with the neck 41, the jaws 35 pass the neck on both sides, and then close resiliently under the action of the spring 34, clamping the neck 41 of the container 40.

At this moment, when the container 40 has been collected by the conveyor device, the mold 37 begins to open partially as shown on an enlarged scale in FIG. 7. (In FIG. 7, the neck 41 of the container is not represented, in order to make it easier to see the two central half-cavities 42a, 42b of the half-molds 37a, 37b which surrounded the neck 41 in the mold 37 in the lower part of FIG. 6, together with the two jaws 35 of the pincer 30 between which the neck of the container is now gripped). In the position of initial opening of the mold 37 shown in FIG. 7, the axis of the jaws 35 of the pincer 30—in other words the axis of the container—still coincides with the axis 39 of the mold, and the pincer 30 accompanies the axis 39 of the mold 37 in its travel along the line V.

FIG. 8 shows the subsequent situation with the mold 37 opened further (but not yet fully open). The axis 43 of the jaws 35 of the pincer 30 (and therefore the axis of the container supported by it) is still on the trajectory V followed by the axis 39 of the mold 37, but a very small offset begins to appear between the axis 43 of the jaws 35 and the axis 39 of the mold, the axis 43 being held back slightly with respect to the axis 39.

Finally, in the situation shown in the upper part of FIG. 6, the mold 37 is in the maximum opening position, while the main arm 26 has already moved away radially by a considerable amount, the container 40 being in the process of disengagement from the mold. It will be noted that the axis 43 of the jaws 35—and therefore the axis of the container 40—is no longer aligned with the axis 39 of the mold 37, but is held back substantially from it, causing the container 40 to follow as closely as possible the wall of the half-mold 37a, but without touching this wall.

Figure 9:
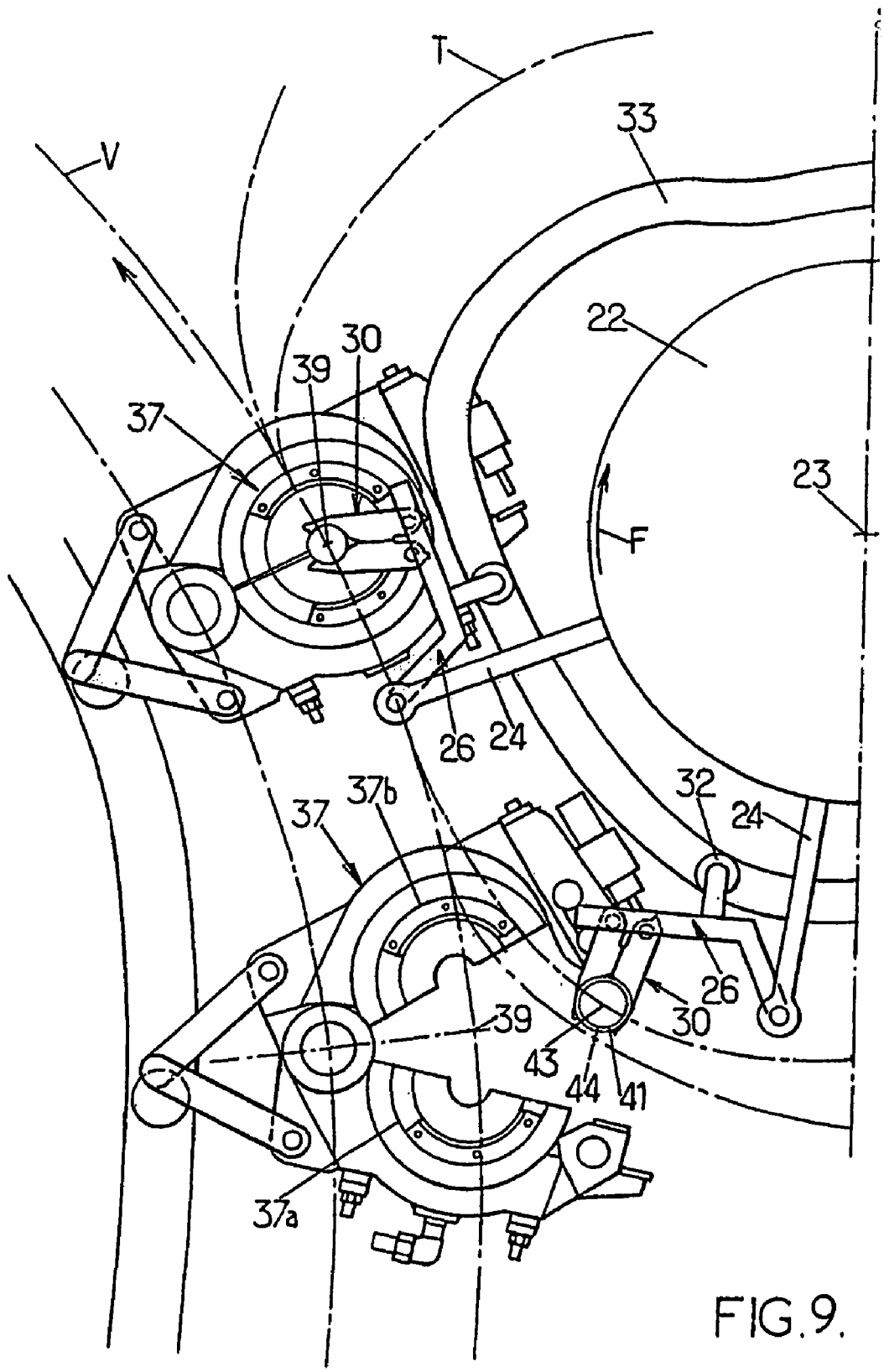
FIG. 9 is a plan view showing the operation of the conveyor device according to the invention at two instants of the process of delivering a container to a mold.

FIG. 9 shows two steps of the delivery of a container (here, for example, a preform) to a mold 37. In the lower part of FIG. 9, the mold 37 is opened to its maximum extent, with its axis 39 following the circular trajectory V, while the pincer 30 supports, by its neck 41, a preform 44 whose axis 43 follows the trajectory T. In the upper part of FIG. 9, the two trajectories T and V coincide, and the pincer 30 and the preform 44 are located coaxially with the mold 37 which is reclosed. Immediately downstream, the two trajectories T and V move away from each other: under the driving force of the main arm 26 which is itself driven by the roller 32 guided by the cam 33, the pincer 30 is pulled radially outward and is disengaged from the neck 41 of the preform 44 which is then supported by the mold 37.

It should be noted that, when the main arm 26 performs the function of collecting a container (FIGS. 6 to 8), the position of the axes of the container (in other words the axis 39 of the mold) and the pincer (axis 43 of the jaws) must be made to coincide exactly at a precise point of the two coinciding trajectories T and V, namely the point at which the pincer grips the container, but no accuracy of relative positioning is required subsequently. Conversely, when the main arm 26 performs the function of delivering a container (FIG. 9), the positions of the axes of the container (in other words the axis of the pincer jaws 30) and of the open mold must be made to coincide exactly at a precise point of the two coinciding trajectories T and V, namely the point at which the pincer releases the container, but no accuracy of relative positioning is required beforehand.

The invention claimed is:

1. A rotary device for transferring containers, having a rotary base which rotates continuously about an axis of rotation and which supports at least one mobile assembly comprising:
   a main arm mounted pivotably on said base by means of a pivot shaft, the pivot shaft and the free end of the main arm defining a line which extends approximately tangentially to the circular trajectory of said pivot shaft, the pivot shaft preceding the free end of the arm in the direction of rotation of the base,
   a gripping pincer mounted on the free end of said main arm, and
   at least one freely rotating roller connected solidly to said main arm and capable of interacting with, by following, a fixed curvilinear cam extending along a closed contour,
   the curvilinear cam being configured in such a way that, during the rotation of the base the gripping pincer mounted on said free end of the main arm follows, over a fixed angular range of the rotation of the base, a predetermined circular path whose convexity is the inverse of the trajectory of the rotary base,
   wherein said gripping pincer is mounted at the free end of said main arm in such a way that it extends approximately transversely to the latter, and wherein, during the rotation of the base, the gripping pincer, mounted on the free end of said main arm driven by the follower roller which interacts with the cam, is moved by pivoting approximately radially.

2. The device as claimed in claim 1, wherein said main arm of the mobile assembly is approximately L-shaped, with a first branch mounted, by one of its ends, on said rotary base by means of said pivot shaft, and with a second branch extending approximately transversely to said first branch, and
   wherein said first branch supports, at its free end, said gripping pincer which extends substantially transversely to said second branch.

3. The device as claimed in claim 2, wherein said follower roller is connected solidly to the second branch of the main arm.

4. The device as claimed in claim 2, wherein said follower roller is connected solidly to the second branch of the main arm and wherein said follower roller is supported by a lever arm which extends approximately transversely to the second branch of the main arm, opposite the first branch.

5. The device as claimed in claim 2, wherein said follower roller is connected solidly to the second branch of the main arm, wherein said follower roller is supported by a lever arm which extends approximately transversely to the second branch of the main arm, opposite the first branch, and wherein said first branch and said gripping pincer extend on the same side of the second branch and the lever arm extends on the opposite side.

6. The device as claimed in claim 2, wherein said first branch and said second branch of the main arm form between them an angle of more than 90° and within the range from 100° to 110°.

7. The device as claimed in claim 2, wherein said pincer is oriented, with respect to said second branch of the main arm, at an angle of more than 90° and within the range from 95° to 110°.

8. The device as claimed in claim 1, wherein said rotary base comprises a plate and at least one support arm connected solidly to said plate and extending substantially radially thereto, and wherein the end of said support arm supports the pivot axis of the mobile assembly.

9. The device as claimed in claim 1, wherein the pincer is of the type which is automatically returned by a spring to the closed position.

10. The device as claimed in claim 1, comprising two idle follower rollers, one above the other, for interaction, respectively, with two cams, namely the inner and outer cams respectively, which are offset vertically with respect to each other.

* * * * *